Jan. 12, 1960 N. J. HALIP 2,920,767
MERCHANDISE EXHIBITOR
Filed May 11, 1954 2 Sheets-Sheet 2
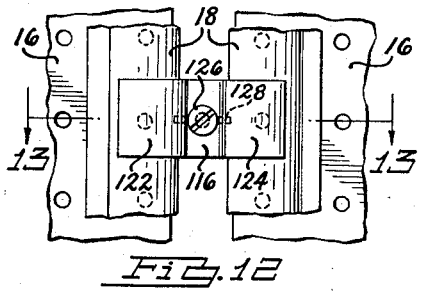
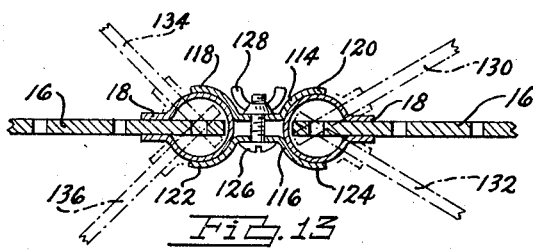
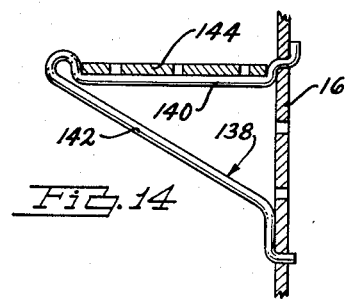
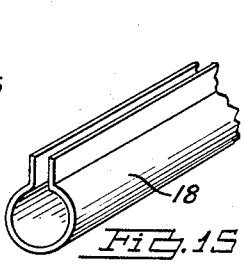
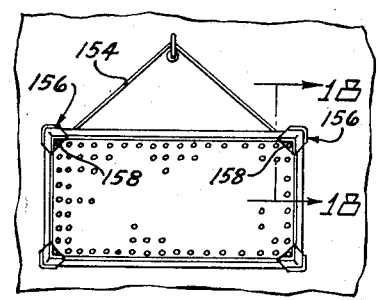
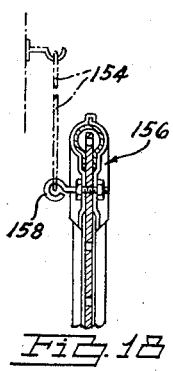
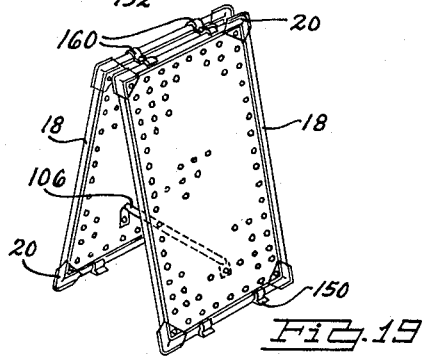
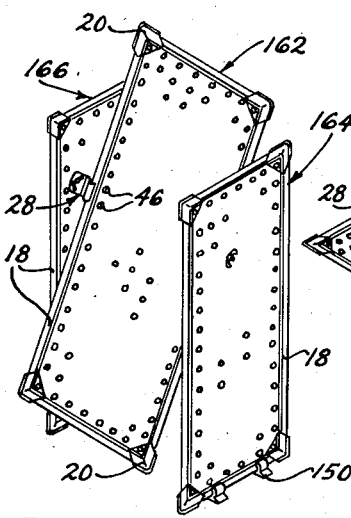
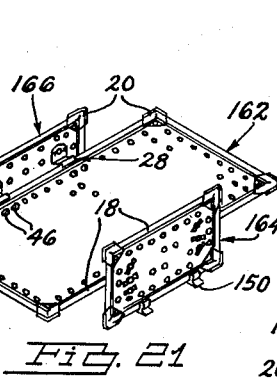
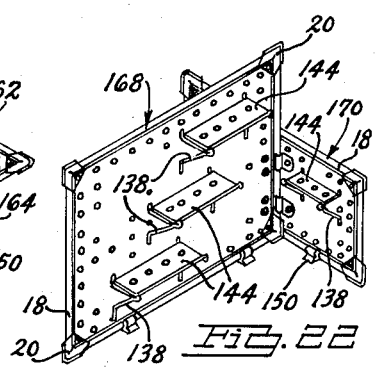
INVENTOR.
NICKOLAS J. HALIP
BY
*Sidney A. Ochs*
ATTORNEY United States Patent Office 2,920,767
Patented Jan. 12, 1960

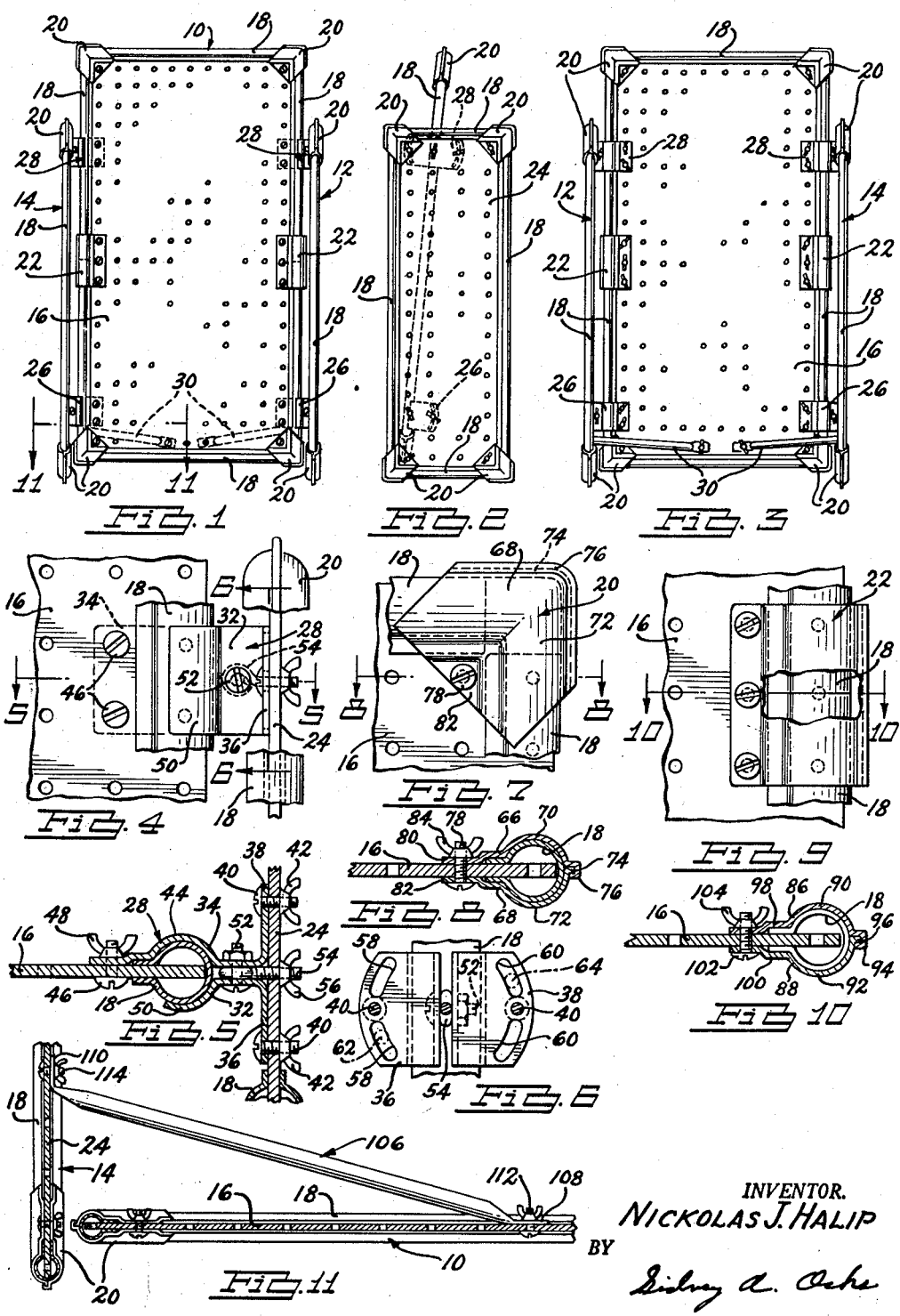

2,920,767
MERCHANDISE EXHIBITOR
Nickolas J. Halip, Windsor, Ontario, Canada
Application May 11, 1954, Serial No. 429,092
14 Claims. (Cl. 211—175)

My invention relates generally to display panels for exhibiting merchandise for sale and to a unique and advantageous means for securing a plurality of such panels into a display panel assembly having any of a plurality of configurations as desired.

More particularly, my invention relates to a light-weight structural assembly for use in combination with a suitable commercially available panel board material or the like to form a sturdy, compact and inexpensive merchandise display unit for advertising purposes.

The provision of a display unit of the type referred to above being a principal object of my invention, another object of my invention is to provide a panel framing assembly for use with panels or walls formed of a suitable fibrous material or the like, said framing assembly including metal side rails formed in various predetermined standard lengths which are adapted to be readily mounted on the edges of the panels.

A further object of my invention is to provide a novel display panel corner construction for use with an assembly of the type set forth in the preceding objects, said corner construction being adapted to secure adjacent ends of the side rails together to form a sturdy, composite metal frame about the periphery of the display panel. I contemplate that the corner construction may be readily and conveniently assembled and disassembled and may be interchangeably used with panels of various shapes and forms.

A further object of my invention is to provide a new and improved clamping means for securing together the side rails of two adjacent panels of the type referred to above. It is contemplated that the clamping means should comprise interchangeable clamping elements which may be readily assembled and disassembled and which are adapted to provide an angular adjustment of the adjacent panels with respect to each other.

A further object of my invention is to provide a new and improved coupling means for conveniently joining together adjacent ends of axially aligned side rails of the type referred to above for use with elongated display panels, said coupling means being adapted to be used individually or in groups to rigidly unite rails of a standard length to form a multiple piece rail of various lengths.

Another object of my invention is to provide a rigid clamping means for securing the side rail of a display panel of the type previously mentioned to the framed panel board material or body portion of an adjacent panel, the adjacent panels being secured thereby at a fixed angle with respect to each other.

A further object of my invention is to provide a clamping means of the type referred to in the preceding object which is further characterized by a means for adjusting the angular position of one joined panel with respect to the other about an axis perpendicular to the plane of said other panel, said clamping means including a means for selectively securing the joined panels in the adjusted position.

A further object of my invention is to provide a new and improved panel supporting element or foot, any number of which may be conveniently clamped to the previously mentioned side rails at any desired position thereon to provide a suitable means for supporting a display panel assembly upon a fixed horizontal surface.

I contemplate that the panel board material for the individual display panels may be suitably apertured to permit certain brackets, hooks and fasteners to be received therethrough for supporting articles of merchandise and for securing the same to the panels. One such bracket comprises a wire having a horizontally extending portion for supporting a suitable display platform or shelf, the ends of the wire being received within the panel apertures. This wire bracket will subsequently be described in particular detail.

I further contemplate that a tubular brace may be secured to the joined panels, if desired, to further rigidify any of the above mentioned clamped panel assemblies.

I further contemplate that the use of the side rails, the corner construction, the coupling means, the various clamping means and the other constituent elements and sub-assemblies for the purposes set forth in the above objects may be assembled and disassembled with a simple manual operation which is within the scope of the ability of a person of ordinary skill and will require no special tools.

I further contemplate that the various component elements of the display panel assembly of my instant invention may be used in a variety of different ways with board material of various shapes and sizes. The number of panels in each assembly may be varied as desired, certain typical arrangements being disclosed herein for the purpose of illustration.

I prefer to use a rigid board material such as fibre board, plywood or the like in forming the body portion of the individual display panels of my invention although it will become apparent that other materials may be employed with equal success. For example, a cloth-like material or a metallic screen may be employed if desired, the choice of one material rather than another being dictated largely by the type of merchandise to be displayed. Structural rigidity of the individual panels or of an assembly of panels, as appropriate, may be obtained regardless of the degree of rigidity of the material of which the body portion of the individual panels is formed.

I prefer to employ a light-weight metal such as an aluminum alloy in forming the structural elements of my invention, although it will become apparent that other structural materials may also be employed.

In carrying forth the foregoing objects, I have provided a preferred form of side rail elements of the type referred to above with a substantially tubular shape having a flanged, axially extending open seam or side opening. An edge of the panel board material may be readily inserted through the flanged opening.

I have provided a panel corner construction for securing together adjacent ends of the side rails disposed along two intersecting edges of the panel board material, said corner construction comprising two juxtaposed elements adapted to be clamped over the ends of the side rails. I have formed the two elements with interlocking outer peripheral edges, a single fastening means such as a bolt and wing nut being required to maintain the elements in interlocked, mating relationship.

The previously mentioned clamping means for securing together the side rails of adjacent panels comprises a pair of juxtaposed, interchangeable clamping elements having arcuate portions adapted to contact the tubular side rails, said elements being secured in place by a suitable fastening means such as a bolt and wing nut.

A rail coupling element of the type referred to in the foregoing objects is provided for joining together the ends of aligned side rails and it comprises a pair of rail clamping elements which are somewhat similar in form to the corner construction previously described in that I have provided the same with interlocked outer peripheral edges. A bolt and wing nut or the like may be provided for maintaining these elements in clamped engagement. However, the coupling means differs from the corner construction in that it is adapted to secure together the ends of axially aligned rails as distinguished from rails which are disposed at an angle with respect to each other.

A clamping means for securing the side rail of one display panel to the body portion or panel material of a second display panel is comprised of a pair of clamping elements having opposed arcuate portions which surround or partially surround the side rail, each element having an integral flange adapted to be secured to the second display panel. These elements may be secured in clamping engagement by a suitable fastening means, and a second fastening means, such as an eye bolt or the like, may be provided for fixing the clamped sub-assembly to the second display panel board, this second fastening means extending perpendicular to the plane of the integral flange of the clamping elements. I have provided the flanges of certain of the clamping means with arcuate apertures to provide for angular adjustment of one panel with respect to the other about the axis of the second fastening means.

Although I prefer that the cross sectional shape of the side rails should be substantially circular in shape, it will become apparent that other shapes may also be employed. For example, the cross section of the side rail elements may define a square, an ellipse, a triangle, or any other regular or irregular configuration. Further, the side rail elements may be formed without flanges along the edges of the open seam if desired.

It will also become apparent that the corner construction, the clamping means for securing together the side rails of adjacent panels, the rail coupling means, and the clamping means for securing the side rail of one panel to the body portion of another panel are all formed with clamping portions which externally engage the side rail elements. The shape required of these clamping portions is dictated by the shape of the side rail elements themselves, a large variety of such shapes being acceptable.

I have formed panel supporting elements or feet of a suitable flexible material such as hard rubber or the like, these elements comprising a sole portion and a pair of integral concave clamping fingers for engaging the tubular rails. The individual feet may be manually snapped into place at any desired position along the rail.

For a more complete description of the foregoing features as well as other features of one preferred form of my invention, reference will be made to the accompanying drawings wherein:

Figure 1 is a front elevation view of a display panel assembly embodying certain features of my invention;

Figure 2 is a side elevation view of the panel assembly of Figure 1;

Figure 3 is a rear elevation view of the panel assembly of Figure 1;

Figure 4 is a sub-assembly view of the clamping means for securing the side rail of one panel to an adjacent secured panel;

Figure 5 is a cross sectional view of the clamping means of Figure 4 and is taken along the section line 5—5 of Figure 4;

Figure 6 is a sectional view of the clamping means of Figure 4 and is taken along the section line 6—6 of Figure 4;

Figure 7 is a sub-assembly view showing the panel corner construction;

Figure 8 is a cross-sectional view of the corner construction of Figure 7 and is taken along the section line 8—8 of Figure 7;

Figure 9 is a sub-assembly view of the coupling means for securing together adjacent ends of the panel side rails;

Figure 10 is a cross sectional view of the coupling means of Figure 9 and is taken along section line 10—10 of Figure 9;

Figure 11 is a sectional view of the panel assembly of Figure 1 showing a tubular panel supporting bracket and is taken along the section line 11—11 of Figure 1;

Figure 12 is a view of one form of clamping means for securing together adjacent side rails of a panel assembly;

Figure 13 is a sectional view of the clamping means of Figure 12 showing the adjustable features of the same and is taken along section line 13—13 of Figure 12;

Figure 14 is a view of a bracket for supporting a shelf adapted to carry articles of merchandise;

Figure 15 is an isometric detail view of a portion of a panel side rail;

Figure 16 is an isometric view of a panel supporting element or foot;

Figure 17 is a view of an individual display panel provided with a supporting wire secured at either end to the fastening bolts of the panel corner construction;

Figure 18 is a cross-sectional view taken along section line 18—18 of Figure 17; and Figures 19, 20, 21, and 22 represent certain typical display panel arrangements incorporating features of my present invention.

Referring first to the assembly views of Figures 1, 2, and 3, I have generally designated a typical main display panel by numeral 10 and I have generally designated two auxiliary display panels by numerals 12 and 14, respectively. The panel 10 comprises a panel board 16 which is preferably provided with a plurality of regularly spaced apertures as shown. In forming the board 16, I prefer to use a rigid fibre board material which is readily commercially available with pre-formed apertures and which may be conveniently cut to the desired size and shape. Side rails 18 are disposed about the periphery of the board 16 as shown and the adjacent ends of the rails may be joined by the corner construction shown at 20, these corner constructions being shaped to blend with the tubular configuration of the side rails to form a continuous and integral frame assembly. Reference may be made to the detail view of Figure 15 to obtain a better understanding of the preferred form of the side rails 18.

If required, the previously described coupling means may be provided, as shown at 22, for the purpose of forming an elongated side rail from two shorter rail segments.

Each of the auxiliary display panels 12 and 14 includes a panel board material 24 and side rails 18 as in the main display panel 10, the side rails 18 for the panels 12 and 14 also being joined by means of a corner construction 20 at each of the four panel corners as shown.

The elongated side rails 18 for the main panel 10 may be secured to the panel board 24 of the auxiliary panels 12 and 14 by clamping means shown at 26 and at 28. I have made provision for adapting at least one of the clamping means 26 and 28 to permit relative angular adjustment of one panel with respect to the other, one such adjusted position being discernible in the side view of Figure 2.

I prefer to employ a pair of supporting brackets 30, as shown in the rear view of Figure 3, for reinforcing purposes as previously mentioned to provide a rigid and stable panel assembly, one end of the brackets 30 being fastened to the panel board 16 and the other end thereof being fastened to the panel board 24. I have shown the brackets 30 positioned at the lower portion of the panel assembly of Figures 1, 2, and 3 although it is apparent that other positions may be also chosen if desired.

Referring next to Figures 4 and 5, I have illustrated the clamping means 28 in more particular detail. It is apparent from an inspection of these figures that the clamping means 28 comprises two juxtaposed clamping elements 32 and 34, each of which is provided with a flange portion shown at 36 and 38, respectively, extending in opposite directions and situated in a common plane when assembled as shown. The flanges 36 and 38 may be fastened to the panel board material 24 by bolts 40 which extend through the panel apertures and which threadably receive wing nuts 42.

The element 34 further includes a substantially semi-circular portion 44 adapted to encompass one side of the side rail 18 of the display panel 10. The edge of the element 34 remote from the flange 38 may be secured to the apertured panel board material 16 by bolts 46 and wing nuts 48, said bolts and nuts preferably being two in number. The opposite side of the side rail is partially encompassed by an arcuate portion 50 of the element 22 as shown. I have secured elements 32 and 34 together by means of a bolt 52 which is adapted to be received through the eye portion of an eye-bolt 54. The eye-bolt 54 extends substantially perpendicular to the plane of the flanges 36 and 38 and is adapted to extend through a panel aperture in the panel board material 24. A wing nut 56 may be threadably received on the bolt 54.

As best observed in Figure 6, I have provided the flanges 36 and 38 with arcuate slots 58 and 60, respectively. Suitable bolts may be received through these slots and through aligned apertures in the panel board material 24, typical bolt positions being designated by dotted lines at 62 and 64. To provide for rotary adjustment of the panel 10 with respect to the panel 18, for example, the bolts extending through the slots 58 and 60 may be temporarily loosened and the entire panel 10 and bracket assembly 28 may be rotated about the axis of the eye-bolt 54. After the desired adjusted position is obtained, these loosened bolts may be again tightened to maintain the panels in a fixed relationship.

I contemplate that the clamping element 34 may be replaced by a bracket identical in shape to element 32 if desired. Such a modified form of the bracket would be adapted to permit a limited amount of angular adjustment of the panel 10 with respect to the panel 12 about the central axis of the tubular side rail 18.

The clamping bracket 26 is substantially similar to the clamping bracket 28 with the exception that one of the two clamping elements, which would correspond to the clamping element 32 of the bracket 28, lacks a flange of the type shown at 36 in Figure 5. Such a modified clamping bracket may be used with panel assemblies wherein space limitations prohibit the use of a bracket with a double flange. For example, the single flange bracket 26 is used as shown in Figure 2 since a double flange bracket would interfere with the adjacent side rail 18.

I have illustrated the details of the corner construction in Figures 7 and 8. It may readily be observed that the entire corner construction consists of only two substantially identical and opposed halves 66 and 68, each half having a semi-circular portion 70 and 72, respectively, adapted to encompass opposite sides of the rails 18. The portions 70 and 72 may each be formed with a right angle shape as shown in the view of Figure 7, or they may be formed at any other desired angle. The outer peripheral edge 74 of the half piece 68 is provided with a lip which is adapted to become interlocked with the peripheral edge 76 of the half piece 66 when the parts are assembled as shown. The assembled half pieces may be securely clamped together by a single bolt 78 extending through corner web portions 80 and 82 and positioned as shown. A wing nut 84 may be used with bolt 78 to provide for quick assembly and disassembly.

I have shown the construction of the rail coupling means in Figures 9 and 10. This coupling means is somewhat similar in cross section to the cross section of the corner construction and it includes two juxtaposed half pieces 86 and 88 which are respectively provided with semi-circular portions 90 and 92 surrounding opposite sides of a side rail 18. The outer edges of the coupling pieces 86 and 88 are interlocked as shown at 96 and at 94, these interlocked edges being similar to the interlocked edges 74 and 76 of the corner construction of Figures 6 and 7. The inside edges of the coupling pieces may be flanged at 98 and 100 and secured together by a bolt 102 upon which a wing nut 104 may be threadably received.

The contour of the half pieces for the corner construction of Figures 7 and 8 and for the coupling means of Figures 9 and 10 is substantially similar to that of the side rails about which they are clamped. This similarity is especially apparent from an inspection of the cross sectional view of Figures 8 and 10.

I have shown the previously mentioned panel supporting brace in Figure 11 and have designated the same by numeral 106. I prefer to make the brace 106 tubular in cross section to obtain maximum rigidity. The ends of the brace 106 may be formed with flats 108 and 110 through which bolts 112 and 114, respectively, may be received for securing the tube 106 to the adjacent panels 16 and 14.

In Figures 12 and 13 I have shown the construction of the clamping means for securing together adjacent and parallel side rails 18 of adjacent panels. This means comprises a pair of interchangeable clamping elements 114 and 116 having arcuate end portions shown at 118 and 120 and at 122 and 124, respectively. The center portions of the elements 114 and 116 are adapted to receive a clamping bolt 126 having a wing nut 128 for maintaining the arcuate portions of the elements 114 and 116 in clamping engagement with the adjacent rails 18 as shown.

The edge of the arcuate portions 118, 122 and 124 extend over the central axis of the respective rails 18, as shown in Figure 13, thereby preventing the rails 18 from becoming separated. A substantial amount of angular adjustment of one panel with respect to the other may be obtained by virtue of the open ended construction of the clamping means, certain possible angular positions being shown by phantom lines at 130, 132, 134, and 136.

For purposes of illustration, I have shown in Figure 14 one possible means for supporting merchandise upon a panel for display purposes. This means comprises a bracket 138 having a horizontal portion 140 and a brace portion 142. The terminal portion of the bracket 138 may be adapted to be received in the aperture of an apertured panel board material such as the panel board material 16 of Figure 1. This bracket is self-supporting as shown and does not require fastening means. A suitable shelf 144 may be supported as shown on the horizontal portion 140, as shown, to provide a base for carrying articles of merchandise.

I have shown the previously described panel supporting element or foot in detail in Figure 16. This foot comprises a pair of concave fingers 146 and 148 which are integrally formed with a base or sole 150 having suitable treads 152. The concave surfaces of the fingers 146 and 148 are adapted to engage the curved outer surface of a side rail 18, as shown. I prefer to use a resilient, rubber-like material in forming the foot element in order that the concave fingers 146 and 148 may resiliently engage the rail 18 and to permit the foot to be "snapped" into place at any desired position. Various ways in which these elements may be used are illustrated in Figures 18 through 22.

I have shown various possible display panel arrangements in Figures 17 through 22 for purposes of illustration, each of the arrangements employing one or more of the above-described features of my invention. For example, the display panel of Figure 17 may be used substantially as shown and may be supported by a suitable wire or cord 154 as shown. The regular bolts for the corner construction 156 of Figure 7 may be replaced by eye-bolts 158 to provide terminals to which the ends of the wire or cord 154 may be secured.

The panel arrangement of Figure 19 makes use of the adjustable clamping means previously described with reference to Figure 13, these clamping means being shown in Figure 19 at 160

The arrangement of Figure 19 also illustrates one way in which the supporting bracket 106 may be employed. I contemplate that various brackets 106 may be formed and used as required, each bracket being adapted to secure panels disposed at different angles.

The arrangements of Figures 20 and 21 show various applications of the clamping means 28 previously described with reference to Figures 5 and 6. The main display panel shown at 162 may be secured to the side panels 164 and 166 at any desired angular position.

The arrangement of Figure 22 shows one way in which the display shelves of Figure 14 may be employed. The individual shelves 144 may be supported by the brackets 138 which are secured to panels 168 and 170.

It will be readily apparent that a large variety of panel arrangements may be obtained by the use of the various sub-assemblies and components above described, the basic framing structure comprising the side rails and corner construction being common to each of the arrangements. The individual structural elements of my invention may be easily manufactured by quantity production methods such as by means of a stamping operation or the like. The various wing nuts used in the various panel sub-assemblies may conveniently be situated on the reverse surfaces of the individual display panels so as not to detract from the pleasing appearance of the unit.

Having thus described the various novel features of my invention, what I claim and desire to secure by U.S. Letters Patent is:

1. In a merchandise display panel assembly including a panel board adapted to support articles of merchandise, said panel board having a pair of intersecting peripheral edges, a side rail disposed along each of said edges, said rails being hollow and having an axially extending open seam, each of said rails receiving therein one of said peripheral edges, and a panel corner construction securing together adjacent ends of said side rails, said corner construction comprising a pair of juxtaposed clamping portions, the shape of said clamping portions being substantially similar to the contour of said side rails to provide a mating relationship therebetween, the outer edges of one of said clamping portions comprising a lip overlapping a corresponding outer edge of the other clamping portion to provide an interlocked assembly, and an inner part of said clamping portions comprising a lip for seating against said panel board and a fastening means securing said clamping portions in clamped engagement with said rails.

2. In a merchandise display panel assembly including a plurality of perforated panel boards adapted to support articles of merchandise, each of said panel boards having intersecting peripheral edges; a panel framing structure disposed about the periphery of said panel boards comprising hollow side rails, an open seam formed in each of said side rails, each of said side rails receiving a peripheral edge of said panel board through said open seam, a corner construction securing together adjacent ends of said rails comprising a pair of juxtaposed clamping elements, portions of said clamping elements having a shape substantially similar to the contour of said side rails to effect a mating engagement therebetween and other portions providing faces for seating against said panel board, said elements having overlapping and interlocked outer peripheral edges and releasable clamping means adjustably connecting adjacent side rails of a pair of said panel boards.

3. In a merchandise display panel assembly including a plurality of perforated panel boards adapted to support articles of merchandise, each of said panel boards having intersecting peripheral edges; a panel framing structure disposed about the periphery of said panel boards comprising hollow side rails, an open seam formed in each of said side rails, each of said side rails receiving a peripheral edge of said panel board through said open seam, a corner construction securing together adjacent ends of said rails comprising a pair of juxtaposed clamping elements, portions of said clamping elements having a shape substantially similar to the contour of said side rails to effect a mating engagement therebetween and other portions providing faces for seating against said panel board, said elements having overlapping and interlocked outer peripheral edges, and clamping means securing a plurality of said framing structures together to form a complete assembly.

4. A merchandise display panel assembly comprising a panel having opposite faces and having a pair of straight intersecting peripheral edges, a pair of side rails disposed respectively along each of said edges, said rails being substantially tubular in shape and having an open elongated seam into which said side edges project, said rails also having elongated flanges integral therewith on opposite sides of said seams and positioned in substantial abutment with said opposite faces, and juxtaposed corner clamping elements interconnecting adjacent ends of said rails on opposite sides of said panel, each of said elements having substantially straight outer peripheral edge portions disposed at an angle with respect to each other corresponding substantially to the angle between said intersecting panel edges, the peripheral edge of one of said elements defining a lip overlapping the peripheral edge of the opposite element to establish an interlocked engagement, said elements each also having elevated portions embracing adjacent rail ends of said rails, and each having an inner portion seated against a face of said panel, and releasable fastener means securing said elements in clamped engagement with said adjacent rail ends.

5. A merchandise display assembly comprising a panel board adapted to support articles of merchandise, said board having at least one pair of intersecting straight peripheral edges, a side rail disposed along each of said edges, each rail being substantially tubular in shape and having an open seam into which one of said peripheral edges is received, the edges of said open seams being outwardly flanged and said flanges being in substantial abutment with opposite sides of said board and corner means securing the adjacent ends of said side rails together comprising a pair of opposite juxtaposed clamping elements having a contour substantially similar to that of the rails to provide a mating relationship therebetween, the outer edge of one of said elements providing a lip overlapping a corresponding outer edge of the other element to provide an interlocked engagement, said elements each also having an inner portion providing a stepped lip seating against said rail flange and a side of said board, and a fastening means remote from said outer edges of said elements and extending through said inner portions of said elements securing said elements in clamped position against said rails.

6. A merchandise display assembly comprising a panel board adapted to support articles of merchandise, said board having straight peripheral edge portions, a pair of side rails disposed along adjacent edge portions, each of said rails being substantially hollow and having an open seam into which the adjacent edge portion of said board is received, and rail coupling means securing the adjacent ends of said side rails together, said means comprising a pair of juxtaposed opposite clamping elements each having a contour substantially similar to the contour of said rails and being in mating relationship therewith, the outer edge portion of each of said elements comprising a lip overlapping the corresponding outer edge portion of the other element, and the inner edge portions of each element including a lip seating against said board, and fastening means spaced from said outer edges of said elements and extending through said inner lips and board for securing said rails and elements in clamped engagement.

7. A merchandise display panel assembly comprising a plurality of connected panel boards adapted to support articles of merchandise, each board including a substantially rigid panel framing structure comprising tubular side rails received over the peripheral edges of the boards and corner constructions joining adjacent ends of the side rails, one peripheral edge of each board being in adjacency to a peripheral edge of the board to which it is connected and clamping means securing together the side rails of said adjacent peripheral edges, said clamping means comprising juxtaposed and interchangeable clamping elements having arcuate end portions engaged with said rails and fastener means for maintaining said elements in clamped engagement with said rails to provide a positive structural connection between said adjacent panels, said arcuate portions of said clamping elements each including a free edge portion and the free edge portions of said juxtaposed elements being in wide spaced angular relation to permit relative angular adjustment between said adjacent connected panels through a wide angle about an axis substantially corresponding to a line of intersection of the planes of said connected panels.

8. In a merchandise display panel assembly including a plurality of panels adapted to support articles of merchandise, each of said panels including a perforated panel board and a rigid framing structure extending about the periphery of the board, said framing comprising tubular side rails engaging said periphery and corner constructions joining adjacent ends of said side rails; clamping means securing together one side rail of the framing structure of one panel and a panel board of an adjacent panel of said assembly, said clamping means comprising a pair of juxtaposed clamping elements, there being a concave portion formed on each of said elements, said concave portions engaging opposite sides of said one rail, a flange portion formed on at least one of said elements fastened to the panel board of said adjacent panel, fastener means securing said elements into clamping engagement with said rail, and means securing said flanged portion to said panel board of said adjacent panel.

9. The combination as set forth in claim 8 wherein said last-mentioned securing means includes an eye-bolt having an eye portion and a threaded shank portion, said eye portion being secured to said fastener means and said threaded shank portion extending through a perforation of said panel board of said adjacent panel, and a nut for securing said eye-bolt in place on said panel board over said shank portion.

10. The combination as set forth in claim 9 wherein said nut is a wing nut adapted for quick assembly and disassembly.

11. The combination as set forth in claim 9 wherein said flange portion includes at least one arcuate slot, and wherein the said means for securing said flange portion to the panel board of said adjacent panel is received through said arcuate slot and through an aligned aperture in the panel board of said adjacent panel, and wherein said securing means for said flange portion is operable to permit a relative angular adjustment of said panels with respect to each other about the axis of said eye-bolt.

12. In a merchandise display panel assembly including a plurality of panels adapted to support articles of merchandise, each of said panels including a perforated panel board and a rigid panel framing structure extending about the periphery thereof comprising hollow side rails engaging said periphery and corner constructions joining adjacent ends of said side rails; clamping means securing together one side rail of the framing structure of one panel of said assembly and a panel board of an adjacent panel of said assembly, said clamping means comprising a pair of juxtaposed clamping elements, there being a concave portion formed on each of said elements, said concave portions engaging opposite sides of said rail, angular flange portions formed on each of said elements at one end thereof, means securing said flange portions to the panel board of said adjacent panel, fastener means securing said elements into clamping engagement with said one rail, said securing means for said flanges including an eye-bolt having an eye portion and a threaded shank portion; said fastener means being received through said eye portion and said threaded portion extending through a perforation of said panel board, of said adjacent panel, and a second flange portion formed on at least one of said elements at the other end thereof and fastened to the panel board of said one panel.

13. In a merchandise display panel assembly including a plurality of panels adapted to support articles of merchandise, each of said panels including a perforated panel board and a rigid panel framing structure extending about the periphery thereof comprising hollow side rails engaging said periphery and corner constructions joining adjacent ends of said side rails; clamping means securing together one side rail of the framing structure of one panel of said assembly and a panel board of an adjacent panel of said assembly, said clamping means comprising a pair of juxtaposed clamping elements, there being a concave portion formed on each of said elements, said concave portions engaging opposite sides of said rail, angular flange portions formed on each of said elements at one end thereof, means securing said flange portions to the panel board of said adjacent panel, fastener means securing said elements into clamping engagement with said one rail, said securing means for said flanges including an eye-bolt having an eye portion and a threaded shank portion; said fastener means being received through said eye portion and said threaded portion extending through a perforation of said panel board, of said adjacent panel, a second flange portion formed on at least one of said elements at the other end thereof and fastened to the panel board of said one panel, and bracing means fixing said adjacent panels in predetermined adjusted position.

14. In a merchandise display panel assembly including a plurality of panels adapted to support articles of merchandise, each of said panels including a perforated panel board and a rigid panel framing structure extending about the periphery thereof comprising hollow side rails engaging said periphery and corner constructions joining adjacent ends of said side rails; clamping means securing together one side rail of the framing structure of one panel of said assembly and a panel board of an adjacent panel of said assembly, said clamping means comprising a pair of juxtposed clamping elements, there being a concave portion formed on each of said elements, said concave portions engaging opposite sides of said rail, an angular flange portion formed on at least one of said elements and fastened to the panel board of said adjacent panel, fastener means securing said elements into clamping engagement with said rail, and removable panel mounting elements positioned on a lower side rail of said assembly for supporting said assembly on a fixed surface, each of said panel mounting elements being formed of a resilient material and comprising a pair of jaws formed with a clamping surface substantially similar to the contour of said lower side rail, and a sole portion integrally attached to said jaws.

References Cited in the file of this patent

UNITED STATES PATENTS

| | | | |
|---|---|---|---|
| 146,041 | Baker | Dec. 30, | 1873 |
| 420,681 | Gilbert | Feb. 4, | 1891 |
| 1,192,216 | Louden | July 25, | 1916 |
| 1,220,299 | Viden | Mar. 27, | 1917 |
| 1,282,557 | Feldtkeller | Oct. 22, | 1918 |
| 1,475,744 | Brown | Nov. 27, | 1923 |
| 1,828,239 | Bennett et al. | Oct. 30, | 1931 |
| 1,922,142 | Schneider | Aug. 15, | 1933 |
| 1,934,533 | Hallowell et al. | Nov. 7, | 1933 |
| 2,048,359 | Snell | July 21, | 1936 |
| 2,324,820 | Capps | July 20, | 1943 |
| 2,473,217 | Peoples | June 14, | 1949 |
| 2,491,707 | Boyden | Dec. 20, | 1949 |
| 2,757,469 | Knudsen | Aug. 7, | 1956 |

FOREIGN PATENTS

| | | | |
|---|---|---|---|
| 813,221 | Germany | Sept. 10, | 1951 |